Dec. 16, 1924.
C. ERICKSON
MOTOR VEHICLE LOCK
Filed March 17, 1924
1,519,534
2 Sheets-Sheet 1
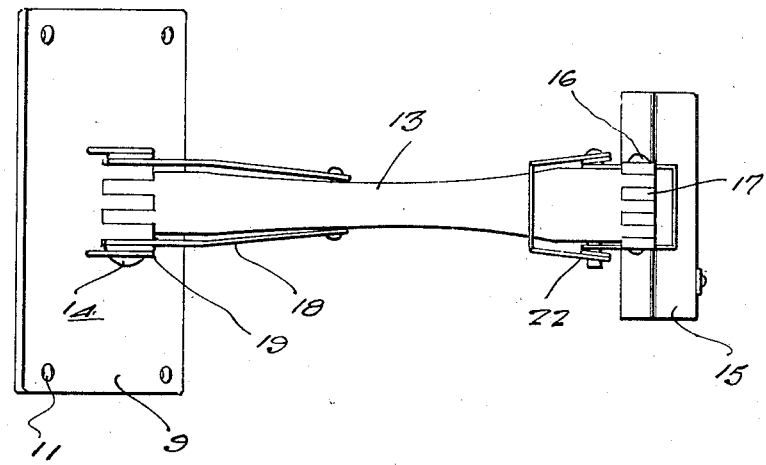
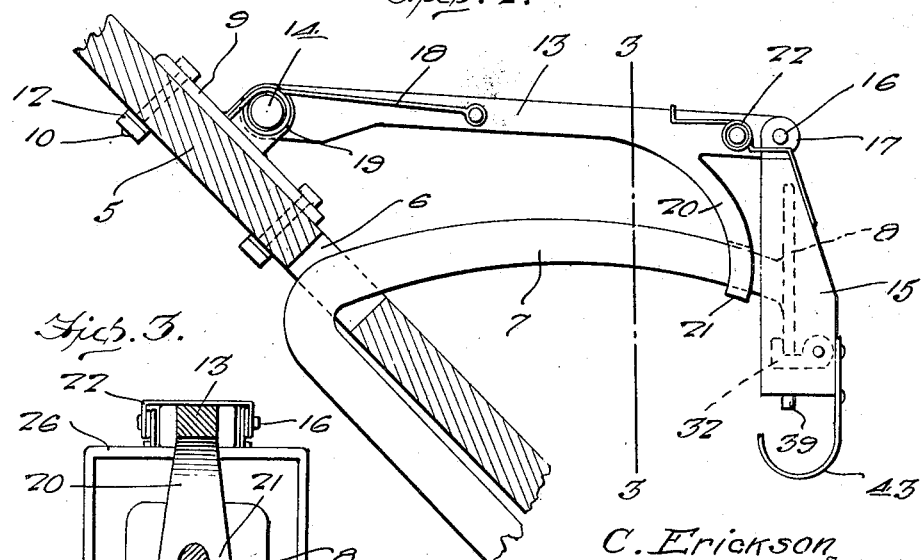
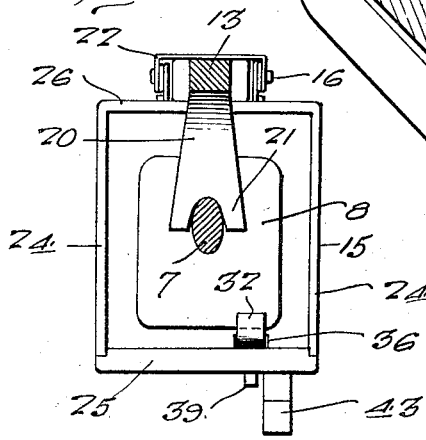
C. Erickson, Inventor Dec. 16, 1924.
C. ERICKSON
MOTOR VEHICLE LOCK
Filed March 17, 1924   2 Sheets-Sheet 2
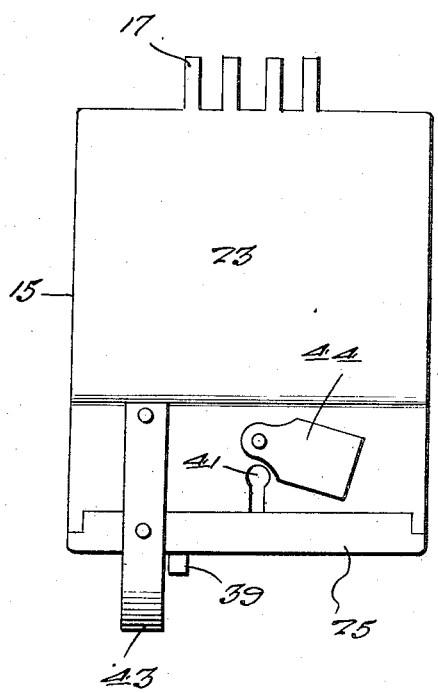
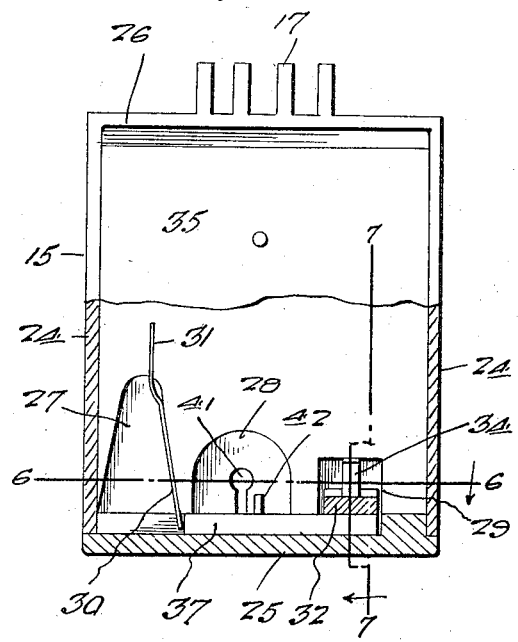
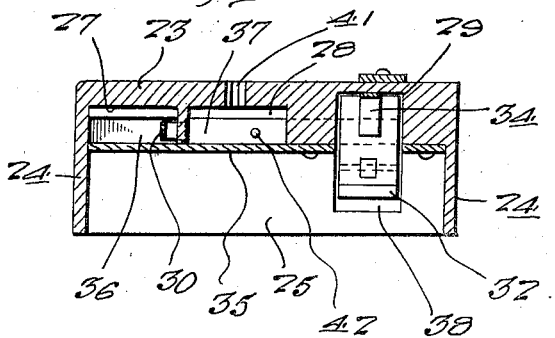
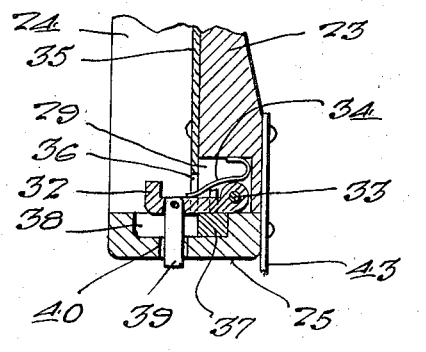
C. Erickson, Inventor Patented Dec. 16, 1924.

1,519,534

UNITED STATES PATENT OFFICE.

CHARLES ERICKSON, OF ASTORIA, OREGON.

MOTOR-VEHICLE LOCK.

Application filed March 17, 1924. Serial No. 699,803.

*To all whom it may concern:*

Be it known that I, CHARLES ERICKSON, a citizen of the United States, residing at Astoria, in the county of Clatsop and State of Oregon, have invented certain new and useful Improvements in Motor-Vehicle Locks, of which the following is a specification.

This invention relates to locks for motor vehicles and has particular reference to means for locking a control pedal, such as the clutch pedal, of a motor vehicle in its normal raised position, so that the same may not be depressed by an unauthorized person, and whereby surreptitious use of a motor vehicle is accordingly prevented for all practical purposes.

The primary object of the invention is to provide a pedal locking device of the above character which is extremely simple and durable in construction, as well as efficient in operation.

Another object of the invention is to provide a pedal locking device of the above kind which may be readily and easily placed into practical use as well as expeditiously engaged with or released from the pedal.

Still another object of the invention is to provide a pedal locking device of the above character embodying key controlled pedal engaging mechanism, movably mounted so as to normally occupy a position out of the path of the pedal to permit actuation of the pedal without inconvenience and to enable movement of the same from its normal position to pedal engaging and locking positions at the will of the operator.

Other objects will appear as the nature of the invention is better understood, and the same consists in the novel form, combination, and arrangement of parts hereinafter more fully described, shown in the accompanying drawings and claimed.

In the drawings wherein like reference characters indicate corresponding parts throughout the several views:

Figure 1 is a top plan view of a pedal locking device constructed in accordance with the present invention.

Figure 2 is a side elevational view of the device shown in Figure 1, and operatively applied to the foot board and pedal of the motor vehicle.

Figure 3 is a vertical transverse sectional view, taken substantially upon the line 3—3 of Figure 2.

Figure 4 is an enlarged rear elevational view of the casing which carries the locking mechanism per se and receives the foot plate of the pedal to be locked.

Figure 5 is a front elevational view of the device shown in Figure 4, partly broken away and in section.

Figure 6 is a horizontal sectional view taken substantially upon the line 6—6 of Figure 5 and Figure 7 is a fragmentary vertical sectional view taken substantially upon the line 7—7 of Figure 5.

Referring more in detail to the drawing, 5 indicates the usual inclined foot board of a motor vehicle in which there is provided the usual opening 6 through which the shank 7 of the clutch pedal projects, the free rear end of which shank is provided with the usual foot plate indicated at 8 in Figures 2 and 3. It is to be understood that the clutch pedal is normally yieldingly maintained elevated by the usual spring thereof and is adapted to be depressed by application of foot power thereto on the part of the operator of the vehicle.

The present invention which contemplates the provision of means for effectively locking the clutch pedal in its normal raised position, so that the same may not be depressed by an unauthorized person consists of a base plate 9 that is adapted to be flatly secured in a permanent manner, and rigidly, upon the upper surface of the foot board 5 at the rear side of the opening 6 as shown in Figure 2. The means for securing the base plate 9 to the foot board 5 may embody bolts 10 extending through corner openings 11 in the base plate 9, and through suitable openings provided in the foot board 5, which bolt may have nuts 12 threaded upon the lower end thereof and suitably locked thereon whereby the base plate may not be removed from the foot board without the expenditure of considerable time and the use of special tools.

The invention further embodies an arm 13 that projects rearwardly from the base plate 9 and has its forward end hinged to the latter as at 14 so that the arm 13 may swing in a vertical direction, the hinged connection embodying interfitting knuckles carried by the base plate 9 and the forward end of the arm 13 and a hinge pin passing through said knuckles so as to form a durable hinge. The arm 13 is of such a length as to have its rear end terminate in substantially the same vertical plane as that in which the pedal plate 8 is disposed when in its normal raised position and suspended from the rear end of the arm 13 is a locking mechanism per se embodying an open front vertical casing 15, that is mounted to swing in a vertical plane by hinging the same as at 16 to the arm 13. The hinged connection 16 embodies interfitting knuckles upon the top of the casing 15 as indicated at 17 in Figures 4 and 5 and similar knuckles provided upon the rear end of the arm 13, a pivot pin being passed through said interfitting knuckles and riveted into place.

The arm 13 is normally yieldingly elevated to a sufficient height to normally maintain the casing 15 in a position spaced above the foot pedal, by means of suitable springs 18, thus normally permitting operation of the foot pedal without obstruction or interference. The springs 18 preferably embody coiled portions 19 positioned at axial sides of and co-axial with the hinged connections 14, the ends of the springs being respectively rigidly secured to the base plate 9 and to opposite sides of the arm 13. In order to limit downward swinging movement of the arm 13 to a position wherein the casing 15 is properly positioned to be swung forwardly in enclosing relation to the foot pedal foot plate 8, the arm 13 is provided with a depending rigid projection 20, the lower end of which is forked or bifurcated as at 21 to partially embrace and rest upon the shank 7 of the foot pedal adjacent to and slightly forwardly of the foot plate 8. The projection 20 is thus positioned to prevent the casing 15 from being swung forwardly to an undue extent.

The casing 15 is normally swung in a forward direction toward its pedal enclosing position by means of a spring 22, the ends of which are rigidly associated with or attached to the adjacent ends of the arms 13 and the casing 15 as shown clearly in Figures 1 and 2.

The casing 15 embodies a rear wall 23 rigid with side walls 24, a bottom wall 25, and a top wall 26, the latter of which has the knuckles 17 rigid therewith. Formed in the forward surface of the wall 23 are recesses 27, 28 and 29, and movable in the recess 27 which is provided adjacent one of the side walls 24 is the lower end of a spring 30 whose upper end is suitably anchored as at 31 in a slot provided in the wall 23 at the top of the recess 27. The rear end of a vertically swinging locking hook 32 is disposed in the recess 29 and pivotally mounted therein at this end upon a horizontal pivot pin 33. This locking hook 32 is normally yieldingly forced downwardly by means of a spring 34, the upper end of which is attached to the wall of a recess 29 and the lower forward end of which bears upon said locking hook 32 as shown in Figure 7. Suitably secured against the forward surface of the wall 23 is a plate 35 which closes the recesses 27 and 28 and partially closes the recess 29, said plate 35 having a slot in the lower portion thereof as at 36 through which the locking hook 32 extends. The plate 35 thus forms means for preventing access to the spring 30 and other parts as will presently become apparent and forms a forward compartment between the side, top and bottom walls of the casing 15 for enclosing reception of the foot plate 8 of the foot pedal. The forward hooked free end of the locking hooks 32 terminate within this compartment or chamber at the lower portion thereof as shown clearly in Figures 6 and 7 and as indicated by dotted lines in Figure 2, so that when the foot plate 8 is positioned in said compartment, the locking hook 32 may be swung upwardly against the action of the springs 34 for engaging the lower edge portion of the foot plate 8 and thereby preventing the depression of the foot pedal.

The bottom wall 25 is provided with a relatively large transverse recess 38, when communicates with one end of the recess 29 and that is located beneath the locking hook 32 for permitting sufficient downward swinging movement of the latter to effect its disengagement from the foot plate 8 of the foot pedal. The bolt 37 is of such a length as to be normally projected by the spring 30 so that its opposite end portion is positioned beneath the locking hook 32 for holding the latter in its raised locking position against the action of the spring 34, and in order to permit manual operation of the locking hook 32 for raising the same to its locking position and for thereby permitting the bolt 37 to be projected beneath said locking hooks, the latter is provided with a depending push button or finger piece 39 that projects downwardly through an opening 40 provided in the bottom wall 25 of the casing 15. The rear wall 23 of the casing 15 is formed with a key hole opening as at 41 communicating with the recess 28 as shown clearly in Figures 5 and 6, and rigid with and projecting upwardly from the bolt 37 is a pin 42 that is movable in said recess 28 and engageable by the bit of a properly formed key inserted through the opening 41 for retracting the bolt 37 against the action of the spring 30 upon rotation of said key. This retraction of the bolt 37 will move its end portion from beneath the latching hook 32 and permit the same to be forced downwardly out of engagement with the foot plate 8 by the spring 34. A suitable finger piece or hook member 43 may be attached to the lower portion of the casing 15 for facilitating manual rearward swinging movement thereof against the action of the spring 22 when the locking hook 32 is released whereby the spring 18 may automatically raise the arm 13 and the casing carried thereby to a position out of the path of the foot pedal thus permitting the operator to actuate said foot pedal in the usual manner. If desired, a suitable plate 44 may be pivoted to the rear wall 23 of the casing 15 to act as a closure for the key hole 41 for a generally well known purpose.

In engaging the device with the pedal, it is simply necessary to grasp the finger piece 43 and exert a rearward and downward pull on the latter so as to swing the arm 13 downwardly against the action of the springs 18 and to swing the casing 15 rearwardly against the action of the spring 22. The casing 15 is then allowed to be swung forwardly into a closing relation with the foot plate 8 of the foot pedal under action of the spring 22, whereupon the key is inserted in the opening 42 and operated for retracting the bolt 37 so as to withdraw the same from beneath the locking hook 32, and so that the latter may be depressed by the spring 34 for permitting the casing 15 to be fully swung forwardly into engaging relation with the plate 8. Upward pressure is then applied upon the push button 39 for lifting the locking hook 32 to locking position as illustrated by dotted lines in Figure 2 and by full lines in Figure 3 whereupon the bolt 37 is released for permitting the same to be projected beneath the locking hook under the influence of the springs 30. In this manner the locking hook 32 effectively engages the lower edge portion of the foot pedal plate 8 and thereby prevents depression of said foot pedal, downward movement of the arm 13 and the casing 15 carried thereby being prevented by the projection 20 bearing upon the shank 7 of the foot pedal so that disengagement of the locking hook 32 from the plate 8 is prevented in this manner. To release the device, it is simply necessary to retract the bolt 37 whereupon the locking hook 32 immediately disengages from the foot plate 8 permitting the casing 15 to be swung rearwardly out of its enclosing relation to the plate 8 and then permitting the spring 18 to elevate the arm 13 and the casing 15 to a point spaced from and above the foot pedal. Obviously, the release of the locking hook 32 may only be effected by a person having the proper key for retraction of the bolt 37 and thus operation of the clutch pedal is prevented except by an authorized person. For this reason, use of a motor vehicle is prevented to all practical purposes except by such authorized persons.

From the foregoing description, it is believed that the construction and operation, as well as the advantages of the present invention will be readily understood and appreciated by those skilled in the art.

What I claim as new is:

1. A clutch pedal lock of the character described comprising a base plate adapted to be rigidly secured upon the foot board of a motor vehicle, a rearwardly extending vertically swinging arm hinged to said base plate, a casing hinged to and suspended from the rear end of said arm and adapted for enclosing relation with the foot plate of said pedals when the arm is lowered, key controlled means carried by said casing for locking the same to and preventing depression of said pedal, said locking mechanism including a locking element engageable with said foot plate of the pedal, said locking element comprising a vertically swinging locking hook and the locking mechanism further embodying a spring projected bolt adapted for retraction by means of a removable key, said bolt being adapted for longitudinal movement and arranged to normally lie beneath the locking hook to maintain the latter in locking position.

2. A clutch pedal lock of the character described comprising a base plate adapted to be rigidly secured upon the foot board of a motor vehicle, a rearwardly extending vertically swinging arm hinged to said base plate, a casing hinged to and suspended from the rear end of said arm and adapted for enclosing relation with the foot plate of said pedals when the arm is lowered, key controlled means carried by said casing for locking the same to and preventing depression of said pedal, said locking mechanism including a locking element engageable with the foot plate of the pedal, said locking element comprising a vertically swinging locking hook and the locking mechanism further embodying a spring projected bolt adapted for retraction by means of a removable key, said bolt being adapted for longitudinal movement and arranged to normally lie beneath the locking hook to maintain the latter in locking position, manually operable means to raise said locking element to its locking position and to permit the spring projection of the bolt therebeneath, and yieldable means to normally swing said locking hook downwardly to released position.

In testimony whereof I affix my signature.

CHAS. ERICKSON.